Aug. 15, 1950   K. PETERSON   2,518,635
MAGNETO-MECHANICAL MOVEMENT
Filed March 24, 1948

Inventor:
Kenneth Peterson
By: Henry Hech
Attorney.

Patented Aug. 15, 1950

2,518,635

UNITED STATES PATENT OFFICE 2,518,635

MAGNETO-MECHANICAL MOVEMENT

Kenneth Peterson, Manhattan, Kans., assignor of three-fourths to Arthur Lehto, Cudahy, Wis.

Application March 24, 1948, Serial No. 16,851

1 Claim. (Cl. 175—21)

The invention relates to a mechanical movement and particularly to a mechanical movement in a magnetic field.

In resting magnetic fields there is no mechanical movement and a magnetic compass needle merely aligns itself in the north-south direction.

It is an object of the invention to produce a mechanical movement in a resting magnetic field and particularly the geo-magnetic field.

It is a further object to vary the rate of speed at which such movement takes place.

It is a further object to provide a plurality of permanet magnets in a carrier and out of alignment with the geo-magnetic field and utilizing the tendency toward alignment to produce a mechanical movement.

Other and equally important objects of the invention will become apparent from a disclosure of the invention which comprises the means described in the following specification, particularly pointed out in the claims and illustrated in the accompanying drawing, in which Fig. 1 is a top plan view of a carrier provided with a plurality of permanent magnets.

Figure 5:
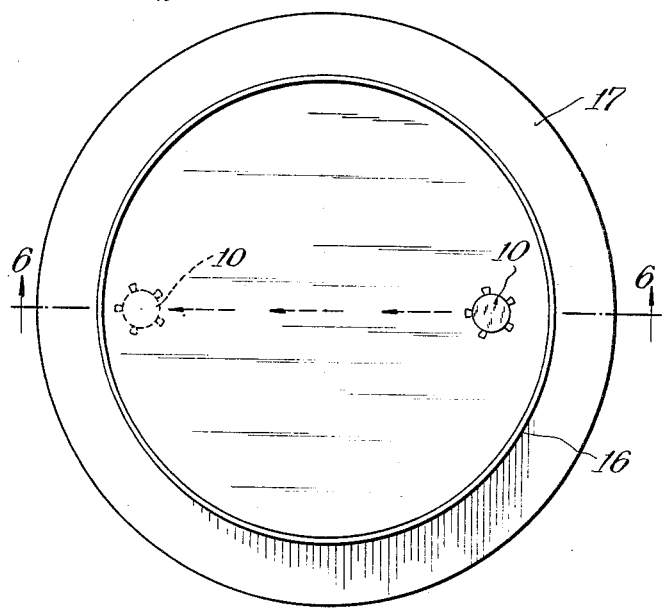
Fig. 5 is a top plan view of a vessel containing a fluid in which the magnet carrier is placed.
Figure 1:
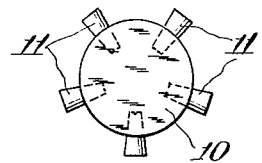
Figure 2:
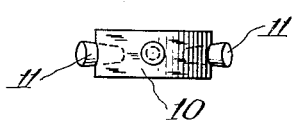
Fig. 2 is a side view.

Referring to the several views of the drawing 10 designates a carrier or float constructed as an annular member made of cork or other suitable material and 11 designates a plurality of permanent magnets which are partly embedded in the carrier and protrude from the sides.

The protruding ends of the magnets have the same polarity and likewise the inner ends have like polarity. Preferably the outer ends of the magnets have north polarity, whereas the inner ends have south polarity.

Figure 3:
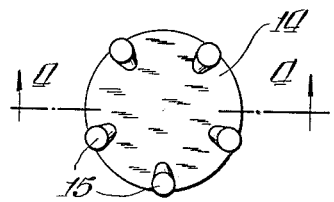
Fig. 3 is a top plan view of modification.
Figure 6:
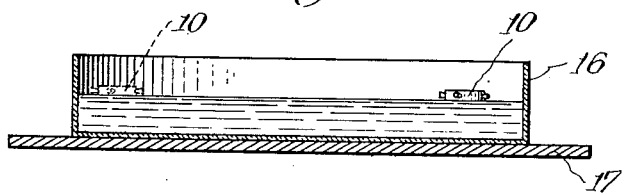
Fig. 6 is a section on the line 6—6 of Fig. 5.
Figure 4:
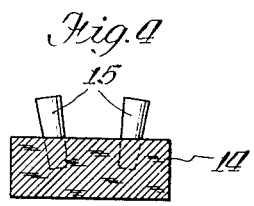
Fig. 4 is a section on the line 4—4 of Fig. 3.

The carrier 14 shown in Figs. 3 and 4 has also a plurality of permanent magnets 15 which, however, are slantingly arranged and partly inserted in the carrier or float. The free ends have north polarity, whereas the inner ends have south polarity.

A vessel 16 made of non-magnetic material is partly filled with a fluid and placed on a shield 17 of de-magnetized ferrous metal.

While a precise scientific explanation for the phenomenon has not been formulated, it is believed that upon placing the float in the vessel it is exposed to the influence of the horizontal geo-magnetic field in a degree different from that of the influence of the vertical geo-magnetic field by reason of the provision of the shield 17, so that there is a resultant force upon the float tending to make it travel in a substantially linear path of north-south direction.

Thus the exposed ends of the permanent magnets 11 being subjected to the attraction and repulsion of the horizontal magnetic field, the float will execute a movement from one side of the vessel to the other until arrested by the wall of the vessel.

It is evident that the movement will be from north to south since the exposed magnet ends have north polarity and will thus proceed toward the south polarity.

The rate of movement is rather slow and was experimentally determined as being five feet per minute.

When the float 14 is placed in the vessel the angularly arranged magnets are out of alignment with the geo-magnetic fields. Magnets in conformity to magnetic action align themselves with other magnets.

The angularly arranged magnets being rigidly secured cannot align themselves with the geo-magnetic field but are attracted by the opposite pole of the magnetic field resulting in the movement of the float.

The rate of movement of the float with angularly arranged magnets has been established as being approximately 30 to 40 feet per minute.

Figure 7:
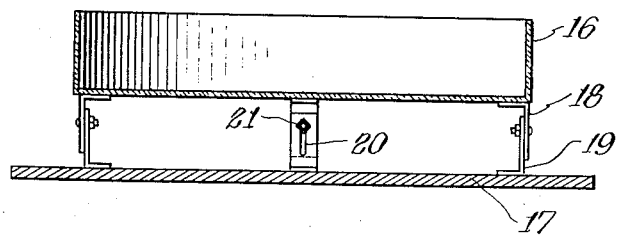
Fig. 7 is a section of a variant.

As shown in Fig. 7 the vessel does not necessarily have to be placed on the shield but may be supported thereon.

To this end the vessel has secured to its bottom angle irons 18 and the shield has angle irons 19.

The vertical legs of angle irons 18 and 19 are provided with slots 20 through which extend a screw 21.

Thus the distance of the vessel over the shield may be varied in accordance with results desired.

If desired the shield may be placed above the vessel to overcome the vertical components of the magnetic field.

The movement produced can be utilized for many purposes such as producing an electric current in a coil of wire placed inductively along the path of movement of a float so that the moving flux will cut the turns of the coil or for the propulsion of toy boats.

I claim:

A magneto-mechanical movement comprising a vessel of non-magnetic material containing a liquid, a non-magnetized magnetic shield positioned in a horizontal plane above or below the surface of said liquid, a non-magnetic flotation body in said liquid, and means movable with said body for maintaining a magnetic flux at the ends of a plurality of axes approximately normal to the horizontal and arranged about a center in said body with like polarities at the correspondingly opposite ends of said axes.

KENNETH PETERSON.

REFERENCES CITED

The following references are of record in the file of this patent:

UNITED STATES PATENTS

| Number | Name | Date |
|---|---|---|
| 555,181 | Prentice | Feb. 25, 1896 |
| 1,595,801 | McDonald | Aug. 10, 1926 |